United States Patent [19]
Hager et al.

[11] Patent Number: 6,063,309
[45] Date of Patent: May 16, 2000

[54] DISPERSION POLYOLS FOR HYPERSOFT POLYURETHANE FOAM

[75] Inventors: Stanely L. Hager; Jack R. Reese, II, both of Cross Lanes, W. Va.

[73] Assignee: ARCO Chemical Technology L.P., Greenville, Del.

[21] Appl. No.: 09/114,792

[22] Filed: Jul. 13, 1998

[51] Int. Cl.$^7$ ........................................... C09K 3/02
[52] U.S. Cl. ................................ 252/182.24; 252/182.27
[58] Field of Search ........................... 252/182.24, 182.27

[56] References Cited

U.S. PATENT DOCUMENTS

| | | |
|---|---|---|
| 3,865,762 | 2/1975 | Repiquet et al. . |
| 4,143,004 | 3/1979 | Stromblad et al. . |
| 5,420,170 | 5/1995 | Lutter et al. ........................ 252/182.27 |
| 5,596,059 | 1/1997 | Hager et al. ............................ 568/620 |
| 5,648,019 | 7/1997 | White, III et al. ................. 252/182.24 |
| 5,811,829 | 9/1998 | Lawrey et al. ..................... 252/182.24 |

FOREIGN PATENT DOCUMENTS 1 381 925   3/1972   United Kingdom .

*Primary Examiner*—John M. Cooney, Jr.
*Attorney, Agent, or Firm*—Brooks & Kushman P.C.

[57] ABSTRACT

Dispersion polyols which are liquid—liquid dispersions containing a first polyol having a substantially polyoxypropylene internal block having an equivalent weight in excess of about 700 Da and a high oxyethylene-content external block, and a second polyol which is a substantially polyoxyethylene polyol containing minimally 50 weight percent oxyethylene moieties. The dispersion polyols are stable and exhibit broad processing latitude when preparing hypersoft polyurethane foams. The dispersion polyols are advantageously prepared in situ, preferably in the presence of a double metal cyanide oxyalkylation catalyst.

16 Claims, No Drawings

DISPERSION POLYOLS FOR HYPERSOFT POLYURETHANE FOAM

TECHNICAL FIELD

The present invention pertains to polyoxyalkylene polyol dispersions and their use in preparing polyurethane foam, particularly hypersoft polyurethane foam. The polyoxyalkylene dispersion polyols comprise a stable liquid—liquid dispersion of two distinct polyoxyalkylene polyols.

BACKGROUND ART

Although polyurethane foam production can be described as a mature technology, processing and performance difficulties associated with polyurethane foam continue to be addressed by the industry. Many of these difficulties arise or are exacerbated when processing and/or performance windows are narrow.

For example, the Montreal Protocol, which mandated the change from chlorofluorocarbons and other halogenated hydrocarbon physical blowing agents to "environmentally acceptable" blowing agents, particularly to the use of water as a reactive blowing agent, created numerous problems, some of which are being addressed even today. The trend to reduced density in products such as soft cushioning foam has also required significant research to enable efficient production of high quality low density foam having the required softness and durability. Recently, hypersoft foam has been increasingly in demand, and its efficient production has required non-traditional processing improvements.

Hypersoft foam may be produced by reacting a di- or polyisocyanate, preferably toluene diisocyanate ("TDI") with a polyol component which includes a high polyoxyethylene content polyol. Thus far, hypersoft foams have also required, in addition, a conventional, high polyoxypropylene-content polyol, in order to be successfully produced. While use of these very different polyols has enabled production of hypersoft foam, the foam processing latitude is often marginal. Moreover, these polyols are not physically compatible, and their blends tend to quickly become inhomogeneous after mixing, requiring inventory of two separate polyols and their separate metering to the mixhead.

It would be desirable to provide a polyol blend which is capable of preparing hypersoft and other polyurethane foams without the necessity of inventorying several polyols for this purpose. It would be further desirable to produce polyol blends which avoid rapid separation during storage, and which offer improved processing latitude when used in preparing hypersoft polyurethane foams.

DISCLOSURE OF INVENTION

It has now been surprisingly discovered that compositions containing a first polyol having a substantial, high polyoxypropylene content internal block and a high polyoxyethylene content external block; and at least a second polyol consisting largely of a high oxyethylene-content block, form a fine, liquid—liquid dispersion which resists separation and layering and is highly suitable for preparing polyurethane foams, particularly hypersoft polyurethane foams. It has been further surprisingly discovered that such polyol blends may be elegantly produced in situ by the catalyzed oxyalkylation of a moderate to high molecular weight polyoxypropylene oligomer with a mixture of alkylene oxides containing in excess of 50 weight percent ethylene oxide, in the presence of an oxyalkylatable low molecular weight starter. The catalyst may be a standard basic oxyalkylation catalyst or preferably a double metal cyanide complex. Hypersoft polyurethane foams may be prepared directly from the subject invention dispersions without the need for an additional, high polyoxypropylene content polyol.

DESCRIPTION OF THE PREFERRED EMBODIMENTS

The polyol blends of the subject invention are termed herein "dispersion polyols", and consist of a liquid—liquid dispersion of minimally two polyols. These dispersions are stable to sedimentation, separation, or "layering" for minimally about three days of storage, and may range in transparency from clear to milky depending upon the dispersed phase concentration and droplet size. Many of the preferred dispersion polyols of this invention are stable for significantly longer time periods. In addition, if separation should occur, they can be easily returned to a fine uniform dispersion by mechanical mixing. "Microscopically homogenous" blends, i.e. those which are true solutions rather than dispersions, are not part of this invention. The term "dispersion" as used herein includes "emulsions" and "microemulsions".

The dispersion polyols of the subject invention comprise minimally two distinct polyols, but may consist of three or more polyols as well. At least one polyol, which is believed to constitute the dispersed phase, is a relatively high molecular weight polyol having a substantial high polyoxypropylene content internal block and a high oxyethylene content external block. At least a second polyol has no substantial, high polyoxypropylene content block, but has a substantial, in relation to its molecular weight, high polyoxyethylene content block. The mandatory first and second polyols employed herein are incompatible in the sense that they do not form true solutions at the relative concentrations used in the dispersion polyol blend.

Both polyols may have nominal functionalities of 2 or higher, preferably from 2 to 8, and more preferably from 2 to 6. Diols and triols are preferred. The polyol actual functionalities will depend upon their manner of preparation, specifically upon the content of unsaturation which is indicative of monol byproduct content. Polyols prepared employing double metal cyanide catalysts and other catalysts which allow preparation of polyols with levels of unsaturation less than 0.02 meq/g and preferably less than 0.01 meq/g will generally have actual functionalities which are within 85–90% or more of the nominal functionality. These polyols are preferred, though suitable dispersion polyols may also be produced with standard basic oxyalkylation catalysts which generally yield polyols with somewhat higher unsaturation levels.

A first necessary polyol, as previously disclosed, is a polyol having a substantial, high oxypropylene content internal block, and an external, high oxyethylene content block. The internal block should have a minimum equivalent weight of about 700 Da (Daltons) and preferably 1000 Da or higher. This block should comprise minimally 65 weight percent oxypropylene moieties, preferably 70 weight percent, more preferably 80 weight percent, and most preferably 90 weight percent or more of oxypropylene moieties. While homopolyoxypropylene blocks are acceptable, particularly when produced by catalysts other than double metal cyanide complex catalysts, i.e. by basic catalysts, calcium naphthenate, etc., it is preferred that the internal block contain from about 1.5% to about 30% oxyethylene moieties, more preferably 2% to 20 weight percent, and most preferably about 5 to about 10 weight percent oxyethylene moieties. Oxyalkylene moieties other than oxypropylene and oxyethylene may be present in minor quantities, e.g. $C_3$ or higher oxyalkylene moieties such as oxybutylene, oxy-n-propylene (derived from oxetane), chloro-substituted oxyalkylene moieties, and the like.

The external block of the first polyol will constitute from about 10 weight percent to about 50 weight percent of the total first polyol weight, more preferably from about 15 weight percent to about 40 weight percent, and most preferably from about 20 weight percent to about 35 weight percent. The external block is minimally about 50 weight percent oxyethylene moieties, more preferably minimally 60 weight percent oxyethylene moieties, and most preferably 70 to about 85 weight percent oxyethylene moieties. External blocks which are greater than 85 percent oxyethylene may also be suitable, particularly when prepared from catalysts other than double metal cyanide catalysts. Most preferably, the remaining moieties of the external block are oxypropylene moieties, but these may also be derived from alkylene oxides other than propylene oxide, e.g. from 1,2-butylene oxide, 2,3-butylene oxide, halogenated alkylene oxides, styrene oxide, etc., and also from oxetane and other monomers copolymerizable with ethylene oxide.

Preferred first polyols are triols, i.e. glycerine-started polyols having 1000 Da to 2000 Da polyoxypropylene internal blocks optionally containing up to about 20 weight percent oxyethylene moieties, and 300 Da to 1500 Da external blocks containing from 65 to 80 weight percent oxyethylene moieties, with the remainder being oxypropylene moieties. The preferred first polyols have levels of unsaturation of less than 0.02 meq/g, more preferably less than 0.010 meq/g. Other preferred first polyols are diol, tetrol, and hexol analogs of the preferred triols. The first polyol must be incompatible with at least one other polyol such that a liquid—liquid dispersion can be prepared.

The second necessary polyol may have the same or different nominal functionality as the first polyol. Unlike the first polyol, the second polyol will not have an internal, high oxypropylene content internal block with an equivalent weight of 700 Da or more. Rather, any internal polyoxypropylene block will preferably have an equivalent weight of no more than about 300 Da, and more preferably no more than 150 Da. Most preferably, each active hydrogen of the hypothetical starter will be substituted by no more than 2 oxypropylene moieties on average, and preferably no more than one oxypropylene moiety. Most preferably, the second polyol will comprise a low molecular weight starter molecule which is directly oxyalkylated with a high ethylene oxide/higher alkylene oxide blend.

For example, preferred low molecular weight starter molecules include ethylene glycol, diethylene glycol, triethylene glycol, 0,0'-bis(2-hydroxypropyl) ethylene glycol, propylene glycol, dipropylene glycol, tripropylene glycol, glycerine, trimethylolpropane, pentaerythritol, sorbitol, sucrose, N,N,N',N'-tetrakis[2-hydroxyethyl]ethylene diamine, N,N,N',N'-tetrakis[2-hydroxypropyl]ethylene diamine; N,N-bis[2-hydroxyethyl]aniline, and the like. Most preferred low molecular weight starters are ethylene glycol, diethylene glycol, propylene glycol, dipropylene glycol, and glycerine.

The second polyol will have a high oxyethylene content external block which has an equivalent weight, for the block, of from about 500 Da to about 2500 Da, more preferably 800 Da to 2000 Da, and most preferably 800 Da to 1500 Da. The oxyethylene content of the second polyol is from 50% to 85% by weight, more preferably 60% to 85% by weight and most preferably 70% to 80% by weight of oxyethylene moieties. The oxyethylene content of the second polyol is preferably similar to the external copolymer block of the first polyol, but is not necessarily so, as long as a stable liquid—liquid dispersion can be maintained.

The polyol blends of the subject invention may contain but one incompatible polyol, or may contain two or more incompatible polyols. The incompatible polyols may constitute a single dispersed liquid phase or may constitute two or more dispersed phases. By the same token, the continuous phase may be a single polyol or mixture of two or more polyols. Preferably, the dispersed phase(s) constitute from about 5 weight percent to about 40 weight percent of the total dispersion polyol, more preferably from about 8% to about 30%, and more preferably from about 10% to about 25%. The total dispersion polyol oxyethylene content will range from about 40 weight percent to about 80 weight percent, more preferably 50 weight percent to 75 weight percent, and most preferably 55 weight percent to about 70 weight percent.

The dispersion polyols of the present invention may be made by any technique which results in a stable dispersion of the two or more polyols having the properties discussed previously. For example, with basic catalysts such as alkali metal hydroxides, alkaline earth metal hydroxides, oxides, etc., and catalysts which exhibit substantially equivalent-weight-independent oxyalkylation rates, the polyols may, in general, be prepared substantially independently of each other and suitably blended using a mixer, colloid mill, etc., to produce the required dispersion.

Preferably, with the catalysts described above, the polyols are made, at least in part, "in situ". For example, if the first polyol is to have a high polyoxyethylene content external block having a weight of 500 Da, and the second polyol is to consist of a single block of similar oxyethylene content and a total second polyol equivalent weight of 1000 Da, the first polyols' internal block can be prepared separately, and this polyol introduced into a reactor in which the second polyol, oxyalkylated to an equivalent weight of ca. 500 Da, is contained. Oxyalkylation of both polyols then continues with a high ethylene oxide content alkylene oxide mixture until both polyols' equivalent weights increase by about 500 Da.

For DMC-catalyzed systems, a particularly elegant polyol preparation employs a continuous addition of starter process, for example a batch or semi-batch type process such as those disclosed in U.S. application Ser. No. 08/597,781, herein incorporated by reference, or the continuous, continuous addition of starter process, as disclosed in U.S. Pat. No. 5,689,012, also incorporated herein by reference.

In both batch-type and continuous versions of the continuous addition of starter processes, low molecular weight starter molecules may be efficiently oxyalkylated in the presence of higher molecular weight polyols.

Using the continuous addition of starter process, for example, an oligomeric, glycerine-derived starter molecule having an equivalent weight of ca. 500–700 Da may be oxyalkylated with a 93:7 ratio of propylene oxide to ethylene oxide while additional, non-oxyalkylated glycerine is added. The oxyalkylation is continued until a first polyol internal (high oxypropylene) block is created and the total polyol content (in mol, for example) is the desired (targeted) amount. Typically, for example, sufficient glycerine and alkylene oxide feed is added to produce a product having an equivalent weight of preferably 800 Da to 2500 Da, most preferably about 1200–1800 Da. Rather than operate employing continuously added starter, the entire first polyol internal block may be prepared by conventional batch techniques either in the same reactor or produced elsewhere and transferred to the reactor for completion of production process.

Following preparation of the first polyol internal block, the composition of the alkylene oxide blend is switched to a high oxyethylene content, i.e. a 75:25 ethylene oxide/propylene oxide ratio. Oxyalkylation continues until the first polyol acquires the desired in-process equivalent weight. For a first polyol having a 1600 Da, high oxypropylene-content internal block, the desired in-process equivalent weight may be about 2000 Da. The in-process equivalent weight is typically at least the minimum desired for the first polyol in the final product. Following achievement of first polyol desired composition and molecular weight, monomeric (non-oxyalkylated) glycerine or other suitable polyhydric starter or a low molecular weight oxyalkylated oligomer is introduced as the high ethylene oxide content feed continues, either at the same ethylene oxide content as before, or at a reduced or elevated ethylene oxide content.

As the reaction continues, the hydroxyl number of the batch will begin to rise as more and more second polyol is produced. When the second polyol equivalent weight is just short of the desired value, i.e. from 500 Da to 2000 Da, and preferably in the range of 800 Da to 1500 Da, the addition of glycerine may be stopped, and the alkylene oxide feed continued for a short period to convert low molecular weight oligomers to second polyols having a fairly uniform molecular weight distribution. The amount of the first polyol and the desired oxyethylene content of the blend will dictate the amount of glycerine added, and will also dictate the weight percentage of the final polyol product which will constitute the first and second polyols. The ethylene oxide content of the blend may be changed at the very end to a high propylene oxide content if a lower primary hydroxyl content is desired. With DMC catalyst, any final finish will preferably contain minimally 1.5 weight percent ethylene oxide or, if all propylene oxide, will preferably constitute no more than 5 weight percent of total polyol weight.

The stable dispersion polyols of this invention have been found to provide superior processing latitude in the production of "hypersoft" polyurethane foams. These foams are manufactured by mixing together a di- or polyisocyanate with water and one or more polyols or polyol mixtures, at least one of which is the dispersion polyol, in the presence of a surface active agent and optionally other standard additives such as catalysts, physical blowing agents, fillers, colorants, flame retardants, etc. Commercial hypersoft foams are differentiated from standard flexible urethane foams in that they are manufactured with a combination of polyols in which the majority polyol has a high oxyethylene content and the lesser polyol has a low oxyethylene content, such that the polyol combination has an oxyethylene content of at least 40% and typically greater than 50%. These foams are generally characterized by a fine cell structure and a unique soft velvety feel. The foaming mixture may be allowed to rise freely in at least one direction, as in a slabstock or bunstock process, or it may be constrained to a fixed shape as in the molded foam process. Included in such processes are the so-called "variable pressure foaming" process in which a vacuum or pressure is applied during foaming by means of enclosure in a pressure chamber, and the "liquid carbon dioxide" processes in which liquified carbon dioxide is introduced into the foaming mixture through special mechanical equipment to aid in blowing the foam.

Having generally described this invention, a further understanding can be obtained by reference to certain specific examples which are provided herein for purposes of illustration only and are not intended to be limiting unless otherwise specified.

EXAMPLE 1

A dispersion polyol is produced in situ employing the double metal cyanide catalyzed continuous addition of starter process for polyoxyalkylene polyol production as disclosed in U.S. Pat. No. 5,689,012. The reactor is charged with a 35 hydroxyl number (1600 Da equivalent weight) triol having a polyoxyalkylene portion containing ca. 94% by weight oxypropylene moieties and 6% by weight oxyethylene moieties. Zinc hexacyanocobaltate.t-butanol complex catalyst in an amount of 30 ppm based on the weight of product dispersion polyol is added, and oxyalkylation commenced with a 25:75 weight ratio of propylene oxide to ethylene oxide. When oxyalkylation has proceeded to the point where the hydroxyl number is 28±2, glycerine co-feed is started, the oxide feed containing 3.2 weight percent glycerine [(wt. gly.)*100/(wt. gly.+wt. oxide)]. The mixed feed is continued until the hydroxyl number reaches 42. The product is a fine liquid—liquid dispersion which shows no signs of agglomerating or layering over at least three days at room temperature. The high equivalent weight starter comprises about 12.4 weight percent of the product. The total weight percent of oxyethylene moieties is about 65%.

EXAMPLE 2

Following the procedure of Example 1 but employing a slightly higher proportion of continuously added glycerine in the mixed feed, a dispersion polyol having a hydroxyl number of 42, a total oxyethylene content of 60 weight percent, and of which the high equivalent weight starter constitutes 17 weight percent of the product is produced.

EXAMPLE 3

Following the procedure of Example 2, but with a slightly larger proportion of continuously added glycerine, a 42 hydroxyl number dispersion polyol containing about 55 weight percent total oxyethylene moieties and of which the high equivalent weight starter constitutes about 22.4 weight percent of the product is produced.

EXAMPLE 4

A dispersion polyol is produced by KOH catalyzed addition of ethylene oxide/propylene oxide (EO/PO) in a 75/25 weight ratio to a starter mixture comprising a high oxypropylene content polyol (Polyol D) and glycerine. Polyol D was made by the standard KOH catalyzed addition of oxide to glycerine, such that the final polyol had a hydroxyl number of 35.2 with 6.3 weight percent of contained oxyethylene and 0.583 weight percent of KOH catalyst residue. Polyol D and glycerine were charged to the reactor in a ratio of 86.5% polyol and 13.5% glycerine and an additional amount of KOH catalyst was added to give between 0.1 and 0.15% KOH in the final product. The 75/25 EO/PO feed was initiated and reacted to yield a final dispersion polyol of this example, which after refining had a hydroxyl number of 43.4 and an oxyethylene content of about 65%.

COMPARATIVE EXAMPLE C1

The procedure of Example 1 is followed, but the high equivalent weight starter is replaced by one having the same proportion of propylene oxide and ethylene oxide but having an equivalent weight of 500 Da. No dispersion polyol is produced. Rather, the polyol product (42 hydroxyl number, 65 weight percent oxyethylene moieties) appears to be a true solution. This example illustrates the importance of having a high oxypropylene content block of high equivalent weight if dispersion polyols are to be produced.

A series of free rise hypersoft polyurethane foams were prepared. In the Examples which follow, C-183 is a standard amine catalyst available from Witco; T-10 is a 50% solution of stannous octoate catalyst available from Witco; B-2370 and B-8040 are silicone surfactants available from Goldschmidt, and TDI-80 is an 80/20 blend of toluene diisocyanate isomers available from ARCO Chemical Company. Polyol A is a commercial 56 hydroxyl number polyol prepared by base catalyzed oxyalkylation of glycerine with a mixture of propylene oxide and ethylene oxide containing 8.5 wt. % ethylene oxide; Polyol B is a commercial hypersoft foam polyol prepared by oxyalkylating a three-functional starter with 25:75 propylene oxide/ethylene oxide to a hydroxyl number of 34; and Polyol C is a commercial hypersoft polyol similar to Polyol B but having a hydroxyl number of 42.

EXAMPLES 5, 6 AND 7, COMPARATIVE EXAMPLES C2–C4

Hypersoft foams were prepared employing a standard polyol (Polyol A) and either a standard hypersoft polyol (Polyols B and C) or a dispersion polyol. The results are presented in Table 1 below.

TABLE 1

| Example: | C2 | C3 | C4 | 5 | 6 | 7 |
|---|---|---|---|---|---|---|
| Polyol A | 20.00 | 20.00 | 20.00 | 20.00 | 20.00 | 20.00 |
| Polyol B | 80.00 | | | | | |
| Polyol C | | 80.00 | | | | |
| Comparative Polyol C1 | | | 80.00 | | | |
| Example 2 Polyol | | | | 80.00 | | |
| Example 1 Polyol | | | | | 80.00 | |
| Example 4 Polyol | | | | | | 80.00 |
| Water | 4.00 | 4.00 | 4.00 | 4.00 | 4.00 | 4.00 |
| C-183 | 0.20 | 0.20 | 0.20 | 0.20 | 0.20 | 0.20 |
| T-10 | 0.12 | 0.12 | 0.12 | 0.12 | 0.12 | 0.12 |
| B-2370 | 1.50 | 1.50 | 1.50 | 1.50 | 1.50 | 1.50 |
| TDI-80 | 42.40 | 43.34 | 43.34 | 43.34 | 43.34 | 43.34 |
| Index | 95.00 | 95.00 | 95.00 | 95.00 | 95.00 | 95.00 |
| Processing | Good | Partial Collapse | Partial Collapse | Good | Good | Good |
| Cell Structure | Coarse | | | Fine | Fine | Fine |
| Density, PCF | 1.59 | | | 1.63 | 1.56 | 1.62 |
| Resiliency, % | 39.00 | | | 36.00 | 38.00 | — |
| Air Flow, CFM | 2.66 | | | 2.17 | 1.96 | 2.41 |
| IFD Thickness, IN. | 4.08 | | | 4.07 | 4.08 | 4.01 |
| IFD 25%, LBS. | 16.57 | | | 15.71 | 16.02 | 13.46 |
| IFD 65%, LBS. | 33.16 | | | 32.55 | 32.60 | 25.96 |
| 25% Return, % | 72.24 | | | 70.72 | 70.41 | 78.82 |
| IFD 65%/25% | 2.00 | | | 2.07 | 2.03 | 1.93 |
| Tensile, PSI | 10.40 | | | 10.00 | 14.98 | — |
| Elongation, % | 338.15 | | | 286.26 | 431.00 | — |
| Tear, PLI | 1.85 | | | 2.10 | 2.06 | — |
| 95% Comp. Set, % | 3.14 | | | 15.20 | 4.64 | — |
| 75% HACS, % | 11.53 | | | 19.76 | 14.77 | — |

The results presented in Table 1 illustrate that the dispersion polyols of the subject invention have broad processing latitude which enables them to be used in conjunction with standard polyols to produce high quality hypersoft foam. Comparative Example C2, employing a standard hypersoft polyol (Polyol B) produced a foam with a coarse cell structure, while substitution of Polyol C for Polyol B led to foam collapse. The use of the polyol of Comparative Example C1, which is not a dispersion polyol, also led to foam collapse in these formulations.

EXAMPLES 8 TO 14 AND COMPARATIVE EXAMPLES C5 TO C10

Two series of hypersoft foams were prepared, the first series employing B-2370 surfactant, the second employing B-8040 surfactant. The results of the first series of foam trials is presented in Table 2.

TABLE 2

| Example: | C5 | C6 | 8 | 9 | C7 | 10 | 11 |
|---|---|---|---|---|---|---|---|
| Polyol C | 100.00 | | | | | | |
| Polyol B | | 100.00 | | | | | |
| Example 3 Polyol | | | 100.00 | | | | |
| Example 2 Polyol | | | | 100.00 | | | |
| Comparative C1 Polyol | | | | | 100.00 | | |
| Example 1 Polyol | | | | | | 100.00 | |
| Example 4 Polyol | | | | | | | 100.00 |
| Water | 4.00 | 4.00 | 4.00 | 4.00 | 4.00 | 4.00 | 4.00 |
| C-183 | 0.20 | 0.20 | 0.20 | 0.20 | 0.20 | 0.20 | 0.20 |
| T-10 | 0.12 | 0.12 | 0.12 | 0.12 | 0.12 | 0.12 | 0.12 |
| B-2370 | 1.50 | 1.50 | 1.50 | 1.50 | 1.50 | 1.50 | 1.50 |
| TDI-80 | 42.93 | 41.75 | 42.93 | 42.93 | 42.93 | 42.93 | 42.93 |
| Index | 95.00 | 95.00 | 95.00 | 95.00 | 95.00 | 95.00 | 95.0 |
| Processing | Collapse | Collapse | Good | Good | Collapse | Internal Voids | Good |
| Cell Structure | | | Fine | Coarse | | | Fine |
| Density, PCF | | | 1.58 | 1.95 | | | 1.62 |
| Resiliency, % | | | 36.00 | 38.00 | | | 37.00 |
| Air Flow, CFM | | | 5.19 | 10.00 | | | 1.50 |
| IFD Thickness, IN. | | | 4.07 | 4.11 | | | 4.04 |
| IFD 25%, LBS. | | | 21.07 | 24.48 | | | 14.00 |
| IFD 65%, LBS. | | | 39.03 | 46.34 | | | 28.21 |
| 25% Return, % | | | 69.29 | 74.06 | | | 73.45 |

TABLE 2-continued

| Example: | C5 | C6 | 8 | 9 | C7 | 10 | 11 |
|---|---|---|---|---|---|---|---|
| IFD 65%/25% | | | 1.85 | 1.89 | | | 2.01 |
| Tensile, PSI | | | 14.62 | 9.39 | | | 12.51 |
| Elongation, % | | | 373.83 | 230.52 | | | 377.50 |
| Tear, PLI | | | 2.33 | 2.14 | | | 1.93 |
| 95% Comp. Set, % | | | 3.92 | 2.92 | | | — |
| 75% HACS, % | | | 9.81 | 5.51 | | | — |

As can be seen from Table 2, all foams prepared from Polyol B alone, Polyol C alone, or Comparative Polyol C1 (not a dispersion polyol) alone led to foam collapse. Foams could be prepared solely from the dispersion polyols of Examples 1, 2, 3, and 4, although the foam from the Examples 1 and 2 polyols were not optimal. In the second series of foams, a different surfactant was used, the results of which are presented in Table 3.

TABLE 3

| Example: | C8 | 12 | C9 | 13 | 14 | C10 |
|---|---|---|---|---|---|---|
| Polyol C | 100.00 | | | | | |
| Example 2 Polyol | | 100.00 | | | | |
| Comparative C1 Polyol | | | 100.00 | | | |
| Example 1 Polyol | | | | 100.00 | | |
| Example 3 Polyol | | | | | 100.00 | |
| Polyol B | | | | | | 100.00 |
| Water | 4.00 | 4.00 | 4.00 | 4.00 | 4.00 | 4.00 |
| C-183 | 0.20 | 0.20 | 0.20 | 0.20 | 0.20 | 0.20 |
| T-10 | 0.12 | 0.12 | 0.12 | 0.12 | 0.12 | 0.12 |
| B-8040 | 1.50 | 1.50 | 1.50 | 1.50 | 1.50 | 1.50 |
| TDI-80 | 42.93 | 42.93 | 42.93 | 42.93 | 42.93 | 41.75 |
| Index | 95.00 | 95.00 | 95.00 | 95.00 | 95.00 | 95.00 |
| Processing | Collapse | Good | Collapse | Good | Good | Collapse |
| Density, PCF | | 1.69 | | 1.82 | 1.61 | |
| Air Flow, CFM | | 4.17 | | 8.27 | 1.95 | |
| IFD Thickness, IN. | | 4.07 | | 4.09 | 4.08 | |
| IFD 25%, LBS. | | 22.16 | | 26.29 | 21.28 | |
| IFD 65%, LBS. | | 40.75 | | 47.50 | 41.36 | |
| 25% Return, % | | 69.81 | | 72.50 | 67.53 | |
| IFD 65%/25% | | 1.84 | | 1.81 | 1.94 | |

As can be seen from Table 3, with the change of surfactant, the subject invention dispersion polyol Examples 1, 2 and 3 displayed good processing characteristics. However, the change in surfactant was unable to improve the processing of foams made from Polyols B or C or Comparative Polyol C1, all foams exhibiting collapse.

By the term "internal block" and analogous terms is meant that portion of the polyol molecule which is adjacent the hypothetical monomeric initiator. For example, when glycerine is an initiator, each of the three oxyalkylatable hydrogen atoms will be oxyalkylated in a statistical manner to form a polyol having three hydroxyl-terminated polyoxyalkylene blocks. These blocks will, as known to the skilled artisan, vary somewhat in their length as the oxyalkylation is essentially random. The equivalent weight of these internal blocks may be ascertained by measuring their colligative properties, i.e. number average molecular weight or hydroxyl number.

By the expressions such as "a first polyol having an internal block" is meant that each oxyalkylatable hydrogen on the hypothetical monomeric starter will have the described block. The term is only restricted in its narrow sense to a single block when monols are contemplated. The same terminology applies to external blocks.

An oligomeric starter is often used. For example, polyoxypropylated glycerine oligomers having an equivalent weight in the range of 300 Da to 1000 Da are often used. These oligomeric starters may be further oxyalkylated with a mixture of propylene oxide and ethylene oxide containing less than 35 weight percent ethylene oxide prior to oxyalkylation with a high ethylene oxide content alkylene oxide mixture. In such a case, the "internal block" will comprise the initial portion of the molecule supplied with the oligomer together with the additional polyoxyalkylene portion obtained by oxyalkylation with the alkylene oxide mixture containing less than 35 weight percent ethylene oxide. The internal block need not have a constant composition along the length of the polyoxyalkylene chain.

By the term "supplying in" and like terms is meant establishing a presence. For example, a fully formed polyol may be introduced into a reactor, or alternatively, the polyol may be synthesized in the reactor in whole or in part. By the term "continuously" with regard to adding alkylene oxide and/or low molecular weight starter is meant that the addition is such to result in a substantially continued presence of the added species in the reactor. For example, incremental addition, while less desirable, may accomplish substantially the same result as truly continuous addition.

By the term "stable" as it applies to dispersion polyols is meant that the liquid—liquid dispersions are stable to visual sedimentation, agglomeration, or layering for minimally 3 days at room temperature (25° C.). Preferably, the dispersions are stable for longer periods; however, if layering should occur, the polyols can be returned to a uniform state by remixing prior to use. By the term "substantially polyoxypropylene block" and like terms is meant that the block comprises no more than 35 weight percent oxyethylene moieties with the balance comprising oxypropylene moieties and optionally other $C_3$ or greater alkylene oxides.

All molecular weights and equivalent weights herein are number average molecular weights and equivalent weights unless indicated to the contrary. Unless indicated otherwise, the term "major" means 50% by weight or more, and the term "minor" means less than 50% by weight.

Having now fully described the invention, it will be apparent to one of ordinary skill in the art that many changes and modifications can be made thereto without departing from the spirit or scope of the invention as set forth herein.

What is claimed is:

1. A dispersion polyol, comprising:
   a) at least one first polyol having an average nominal functionality of from about 2 to about 8, said first polyol having an internal polyoxyalkylene block of minimally about 700 Da equivalent weight and comprising oxypropylene moieties, optionally in admixture with a minor portion with respect to said oxypropylene moieties of one or more $C_3$ or higher oxyalkylene moieties, and about 35 weight percent or less oxyethylene moieties, and an external polyoxyalkylene block comprising minimally 50 weight percent oxyethylene moieties based on the weight of said external polyoxyalkylene block, said external oxyalkylene block constituting from about 10 weight percent to about 50 weight percent of said first polyol total weight; and
   b) at least a second polyol, said second polyol having an external block comprising minimally 50 weight percent oxyethylene moieties, and no internal, high oxypropylene-content block or an internal high oxypropylene-content block of no more than about 300 Da equivalent weight,
said first and second polyols forming a stable liquid—liquid dispersion.

2. The dispersion polyol of claim 1, wherein said first polyol internal block has an equivalent weight of greater than about 1000 Da and comprises minimally 80 weight percent oxypropylene or $C_3$ or greater oxyalkylene moieties; where said external block comprises in excess of about 60 weight percent oxyethylene moieties; and where said second polyol comprises a polyoxypropylene/polyoxyethylene copolymer polyol containing 60 weight percent or more oxyethylene moieties.

3. The dispersion polyol of claim 1, wherein the oxyethylene content of said external block of said first polyol is from in excess of about 60 weight percent to about 85 weight percent.

4. The dispersion polyol of claim 1, wherein the oxyethylene content of said second polyol is from about 60 weight percent to about 85 weight percent.

5. The dispersion polyol of claim 1 wherein said first polyol comprises from about 5 weight percent to about 40 weight percent of said dispersion polyol.

6. The dispersion polyol of claim 1 wherein said first polyol comprises from about 10 weight percent to about 25 weight percent of said dispersion polyol.

7. The dispersion polyol of claim 1 wherein the total oxyethylene content of said dispersion polyol is from about 40 weight percent to about 80 weight percent.

8. The dispersion polyol of claim 1 wherein said first polyol and said second polyol each have nominal functionalities of from about 2 to about 3.

9. The dispersion polyol of claim 1 wherein said first polyol comprises an internal block having an equivalent weight of greater than about 1000 Da which comprises minimally about 80 weight percent oxypropylene moieties and no more than about 20 weight percent oxyethylene moieties, and an external block comprising from about 20 weight percent to about 35 weight percent of the total first polyol weight, said external block comprising in excess of about 60 weight percent oxyethylene moieties.

10. The dispersion polyol of claim 1 wherein said second polyol comprises the oxyalkylation product of a starter molecule having a molecular weight below about 300 Da with a mixture of propylene oxide and ethylene oxide, said mixture containing greater than about 60 weight percent ethylene oxide.

11. The dispersion polyol of claim 9 wherein said second polyol comprises the oxyalkylation product of a starter molecule having a molecular weight below about 300 Da with a mixture of propylene oxide and ethylene oxide, said mixture containing greater than about 60 weight percent to about 85 weight percent ethylene oxide.

12. The dispersion polyol of claim 10 wherein said first polyol has a nominal functionality of from 2 to about 3.

13. A process of the in situ preparation of a dispersion polyol, said process comprising:
   a) supplying in a reactor a first polyol precursor having a nominal functionality of between 2 and 8 and containing less than about 35 weight percent oxyethylene moieties, said first polyol precursor having an equivalent weight of about 700 Da or more;
   b) introducing a low molecular weight polyol initiator having an equivalent weight less than 300 Da into the reactor before or during the oxyalkylation of the first polyol precursor with a mixture of alkylene oxides containing minimally 50 weight percent ethylene oxide in the presence of an oxyalkylation catalyst and continuing the oxyalkylation until the second polyol reaches an equivalent weight of at least 500 Da; and
   c) recovering a stable liquid—liquid dispersion.

14. The process of claim 13 wherein said oxyalkylation catalyst comprises a double metal cyanide catalyst.

15. The process of claim 13 wherein said mixture of alkylene oxides contains from about 60 weight percent to about 85 weight percent ethylene oxide.

16. The process of claim 13 wherein said first polyol precursor has an equivalent weight in excess of 1000 Da.

* * * * *